US009255454B2

(12) United States Patent
Lewis et al.

(10) Patent No.: US 9,255,454 B2
(45) Date of Patent: *Feb. 9, 2016

(54) SET-DELAYED CEMENT COMPOSITIONS COMPRISING PUMICE AND ASSOCIATED METHODS

(71) Applicant: Halliburton Energy Services, Inc., Houston, TX (US)

(72) Inventors: Samuel J. Lewis, Spring, TX (US); Thomas Jason Pisklak, Cypress, TX (US); Kyriacos Agapiou, Houston, TX (US); Peter James Boul, Houston, TX (US); Lance Everett Brothers, Chickasha, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 209 days.

This patent is subject to a terminal disclaimer.

(21) Appl. No.: 14/019,730

(22) Filed: Sep. 6, 2013

(65) Prior Publication Data

US 2014/0000893 A1    Jan. 2, 2014

Related U.S. Application Data

(63) Continuation-in-part of application No. 13/417,001, filed on Mar. 9, 2012, now Pat. No. 8,851,173.

(51) Int. Cl.
| | |
|---|---|
| *E21B 21/01* | (2006.01) |
| *C09K 8/467* | (2006.01) |
| *C04B 28/18* | (2006.01) |
| *C04B 40/06* | (2006.01) |

(52) U.S. Cl.
CPC ............... *E21B 21/01* (2013.01); *C04B 28/18* (2013.01); *C04B 40/0658* (2013.01); *C09K 8/467* (2013.01)

(58) Field of Classification Search
None
See application file for complete search history.

(56) References Cited

U.S. PATENT DOCUMENTS

| | | | |
|---|---|---|---|
| 2,848,051 A | * | 8/1958 | Williams ................ 166/291 |
| 3,557,876 A | | 1/1971 | Tragesser |
| 3,887,009 A | | 6/1975 | Miller et al. |

(Continued)

FOREIGN PATENT DOCUMENTS

WO     2011-161411     12/2011

OTHER PUBLICATIONS

U.S. Office Action for U.S. Appl. No. 13/417,001 dated Apr. 16, 2014.

(Continued)

*Primary Examiner* — Angela M DiTrani
*Assistant Examiner* — Anuradha Ahuja
(74) *Attorney, Agent, or Firm* — Craig W. Roddy; Tumey LLP

(57) ABSTRACT

Set-delayed cement compositions and methods of using set-delayed cement compositions in subterranean formations. Embodiments include a method of drilling a wellbore in a subterranean formation comprising: circulating a drilling fluid comprising a set-delayed cement composition in the wellbore while drilling the wellbore, wherein the set-delayed cement composition comprises: pumice, hydrated lime, a set retarder, and water. A method of displacing a fluid in a wellbore comprising: introducing a spacer fluid comprising a set-delayed cement composition into a wellbore such that the spacer fluid displaces one or more prior fluids from the wellbore, and wherein the set-delayed cement composition comprises: pumice, hydrated lime, a set retarder, and water.

20 Claims, 3 Drawing Sheets

(56) References Cited

U.S. PATENT DOCUMENTS

| | | | |
|---|---|---|---|
| 3,959,003 A | 5/1976 | Ostroot et al. | |
| 4,054,462 A * | 10/1977 | Stude | 106/717 |
| 4,274,881 A | 6/1981 | Langton et al. | |
| 4,349,443 A | 9/1982 | Block | |
| 4,350,533 A | 9/1982 | Galer et al. | |
| 4,462,837 A * | 7/1984 | Baker et al. | 106/720 |
| 4,515,216 A | 5/1985 | Childs et al. | |
| 4,519,452 A | 5/1985 | Tsao et al. | |
| 4,524,828 A | 6/1985 | Sabins et al. | |
| 4,676,832 A | 6/1987 | Childs et al. | |
| 4,818,288 A | 4/1989 | Aignesberger et al. | |
| 4,875,937 A | 10/1989 | Viles | |
| 5,058,679 A | 10/1991 | Hale et al. | |
| 5,263,542 A | 11/1993 | Brothers | |
| 5,314,022 A * | 5/1994 | Cowan et al. | 166/293 |
| 5,447,197 A | 9/1995 | Rae et al. | |
| 5,503,671 A | 4/1996 | Casabonne et al. | |
| 5,547,506 A | 8/1996 | Rae et al. | |
| 6,173,778 B1 | 1/2001 | Rae et al. | |
| 6,457,523 B1 | 10/2002 | Vijn et al. | |
| 6,488,762 B1 | 12/2002 | Shi | |
| 6,610,140 B2 | 8/2003 | Vijn et al. | |
| 6,907,928 B2 | 6/2005 | Di Lullo Arias et al. | |
| 6,908,508 B2 | 6/2005 | Brothers | |
| 7,086,466 B2 | 8/2006 | Roddy et al. | |
| 7,199,086 B1 | 4/2007 | Roddy et al. | |
| 7,201,798 B2 | 4/2007 | Brothers et al. | |
| 7,338,923 B2 | 3/2008 | Roddy et al. | |
| 7,478,675 B2 | 1/2009 | Roddy et al. | |
| 7,559,369 B2 | 7/2009 | Roddy et al. | |
| 7,575,055 B2 | 8/2009 | Reddy et al. | |
| 7,617,870 B1 | 11/2009 | Roddy et al. | |
| 7,670,427 B2 | 3/2010 | Perez-Pena | |
| 7,674,332 B2 | 3/2010 | Roddy et al. | |
| 7,743,828 B2 | 6/2010 | Roddy et al. | |
| 7,784,542 B2 | 8/2010 | Roddy et al. | |
| 7,789,150 B2 | 9/2010 | Roddy et al. | |
| 7,806,183 B2 | 10/2010 | Roddy et al. | |
| 7,836,954 B2 | 11/2010 | Morgan et al. | |
| 7,855,170 B2 | 12/2010 | Perera et al. | |
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,183,186 B2 | 5/2012 | Luo | |
| 8,281,859 B2 | 10/2012 | Roddy et al. | |
| 8,297,357 B2 | 10/2012 | Brenneis et al. | |
| 8,307,899 B2 | 11/2012 | Brenneis et al. | |
| 8,403,045 B2 | 3/2013 | Brenneis et al. | |
| 8,476,203 B2 | 7/2013 | Patil | |
| 8,486,869 B2 | 7/2013 | Brenneis et al. | |
| 8,851,173 B2 * | 10/2014 | Brothers et al. | 166/292 |
| 8,899,329 B2 | 12/2014 | Chatterji et al. | |
| 8,910,708 B2 | 12/2014 | Chatterji et al. | |
| 2002/0050232 A1 * | 5/2002 | Yamashita et al. | 106/802 |
| 2002/0162657 A1 | 11/2002 | Tumlin et al. | |
| 2003/0121456 A1 | 7/2003 | Griffith et al. | |
| 2003/0188669 A1 | 10/2003 | Sobolev et al. | |
| 2003/0221778 A1 | 12/2003 | Musch et al. | |
| 2004/0112600 A1 | 6/2004 | Luke et al. | |
| 2004/0127606 A1 * | 7/2004 | Goodwin | 524/2 |
| 2004/0211342 A1 | 10/2004 | Sprouts et al. | |
| 2004/0226484 A1 | 11/2004 | Chatterji et al. | |
| 2005/0079016 A1 | 4/2005 | Greenwood et al. | |
| 2006/0041060 A1 * | 2/2006 | George et al. | 525/56 |
| 2006/0054320 A1 * | 3/2006 | Brothers et al. | 166/292 |
| 2006/0166834 A1 | 7/2006 | Roddy et al. | |
| 2006/0249054 A1 | 11/2006 | Brothers et al. | |
| 2006/0249289 A1 | 11/2006 | Brothers et al. | |
| 2007/0089643 A1 * | 4/2007 | Roddy et al. | 106/692 |
| 2007/0125534 A1 * | 6/2007 | Reddy et al. | 166/277 |
| 2007/0235192 A1 | 10/2007 | Michaux et al. | |
| 2007/0289744 A1 | 12/2007 | Bringamon et al. | |
| 2008/0066652 A1 | 3/2008 | Fraser et al. | |
| 2008/0169100 A1 | 7/2008 | Lewis et al. | |
| 2009/0011207 A1 | 1/2009 | Dubey | |
| 2009/0020044 A1 * | 1/2009 | Constantz et al. | 106/738 |
| 2009/0038800 A1 * | 2/2009 | Ravi et al. | 166/292 |
| 2009/0124522 A1 | 5/2009 | Roddy et al. | |
| 2010/0016183 A1 | 1/2010 | Roddy et al. | |
| 2010/0025039 A1 | 2/2010 | Roddy et al. | |
| 2010/0041792 A1 | 2/2010 | Roddy et al. | |
| 2010/0044043 A1 * | 2/2010 | Roddy et al. | 166/294 |
| 2010/0258312 A1 | 10/2010 | Brenneis et al. | |
| 2010/0270016 A1 | 10/2010 | Carelli et al. | |
| 2010/0273912 A1 | 10/2010 | Roddy et al. | |
| 2010/0282466 A1 * | 11/2010 | Brenneis et al. | 166/293 |
| 2010/0313795 A1 | 12/2010 | Guynn et al. | |
| 2011/0017452 A1 * | 1/2011 | Benkley et al. | 166/292 |
| 2011/0132605 A1 | 6/2011 | Sarap et al. | |
| 2011/0162845 A1 | 7/2011 | Ravi | |
| 2011/0305830 A1 * | 12/2011 | Frantz et al. | 427/230 |
| 2012/0167803 A1 | 7/2012 | Luo | |
| 2012/0186494 A1 | 7/2012 | Roddy | |
| 2012/0190769 A1 | 7/2012 | Patil | |
| 2012/0192768 A1 | 8/2012 | Ravi | |
| 2012/0211227 A1 | 8/2012 | Thaemlitz | |
| 2012/0249552 A1 | 10/2012 | Harvill et al. | |
| 2012/0251079 A1 | 10/2012 | Meschter et al. | |
| 2012/0252304 A1 | 10/2012 | Vaughan | |
| 2012/0325478 A1 | 12/2012 | Muthusamy et al. | |
| 2013/0233550 A1 | 9/2013 | Brothers | |
| 2013/0248183 A1 | 9/2013 | Pisklak | |
| 2014/0020895 A1 | 1/2014 | Agapiou et al. | |
| 2014/0034313 A1 | 2/2014 | Pisklak et al. | |
| 2014/0034314 A1 | 2/2014 | Lewis et al. | |
| 2014/0048267 A1 | 2/2014 | Pisklak et al. | |
| 2014/0083701 A1 | 3/2014 | Boul et al. | |
| 2014/0090843 A1 | 4/2014 | Boul et al. | |
| 2014/0202698 A1 | 7/2014 | Pisklak et al. | |
| 2014/0216746 A1 | 8/2014 | Ballew et al. | |
| 2014/0318419 A1 | 10/2014 | Chatterji et al. | |
| 2015/0197033 A1 | 7/2015 | Agapiou et al. | |
| 2015/0197453 A1 | 7/2015 | Pisklak et al. | |

OTHER PUBLICATIONS

HES brochure Enhancer 923™ Cement Agent, H07745 Jun. 2010.
Ramy N.EID, Liquid Cement: Changing the Paradigm, Society of Petroleum Engineers, Apr. 15, 2007.
Notice of Allowance for U.S. Appl. No. 13/417,001 dated Mar. 9, 2012, Aug. 4, 2014.
Search Report and Written Opinion for International Application No. PCT/US2014/032150 dated Aug. 21, 2014.
Benge et al., "Deep Gas-Well Cementation: A Review of Risks and Design Basis for Use of a Liquid Cement Premix for Large Offshore Cementing Operations", IADC/SPE 98970, pp. 1-5, IADC/SPE Drilling Conference, 2006.
Rae et al., "Liquid Cement Premix Introduces New Solutions to Conventional Cementing Problems", IADC/SPE 35086, pp. 393-400, IADC/SPE Drilling Conference, 1996.
Rae et al., "Liquid Cement Premix for Improved Abandonment and Workover Operations", SPE 36477, pp. 637-643, SPE, Inc., 1996.
Anderson et al., "New Technology Eliminates Bulking in Cementing Operations", SPE 36478, pp. 645-653, SPE, Inc., 1996.
Anderson et al., "New Technology Improves Cement Slurry Design", SPE 36973, pp. 127-136, SPE, Inc., 1996.
Shaefer et al., "Utilizing 'Over-Seas' Technology Improves the Cementing Processes in the DJ Basin of Colorado", SPE 80940, pp. 1-8, SPE, Inc., 2003.
"Liquid Stone® Cement Technology", Product Sales Bulletin, BJ Services Company, pp. 1-2, Oct. 19, 2004.
HES brochure "Micro Matrix® Cement Retarder", H01481, Aug. 2007.
HES brochure "CFR-3™ Cement Friction Reducer", H01325, Oct. 2005.
Hess Pumice Products, Inc., "Fact Sheet", located at website www.hesspumice.com, printed from Internet Mar. 2012.
PCT Search Report for PCT International Application No. PCT/US2013/029489 dated Apr. 19, 2013.

(56) References Cited

OTHER PUBLICATIONS

PCT Written Opinion for PCT International Application No. PCT/US2013/029489 dated Apr. 19, 2013.
"Conduction Calorimetric Investigation of the effect of Retarders on the Hydration of Portland Cement", V.S. Ramachandran and M.S. Lowery—Thermochimica Arts, 195 (1992) 373-387.
"Competitive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996, 92(5, 831-841).
Yana, Y. et al., (1996). "Growth and Engineering of Microporous Zeolite Films and Coatings." MRS Proceedings, 431, p. 211.
Malvern Brochure "Zetasizer Nano ZS" dated 2011.
Nissan Chemical Brochure "Snowtex®" dated 2007.
ThermPhos Brochure "Dequest® 2006" printed from the Internet on Mar. 25, 2013.
OFI Testing Equipment, Inc. Brochure "Ultrasonic Cement Analyzer" dated 2013.
HESS Brochure "Pumice Pozz for Well Cements" dated 2013.
BASF Brochure "Oilfield Chemicals Product Range" dated Jul. 2010.
Halliburton Brochure "Micro Matrix®" dated Nov. 2006.
ThermPhos Brochure "Dequest® 2066" printed from the Internet on Nov. 18, 2013.
Benge, O.G. et al., "Evaluation of Blast Furnace Slag Slurried for Oilfield Application" SPE 27449, pp. 169-180, SPE, Inc., 1994.
Halliburton Brochure "Baroid" dated Mar. 25, 2010.
Allahverdi, A. et al., (2006). "Chemical activation and set acceleration of lime-natural pozzolan cement." Ceramics-Silikaty, 193-199.
Brito, A. et al., (2004). "High surface area support, catalyst derived from natural pumice." Study of pretreatment variables. Ind. Eng. Chem. Res., 443, 1659-1664.
Johnson, C.D. et al., (2007). "Zeolitization of pumice-microporous materials on macroporous support structures derived from natural minerals." J. Mat. Chem., 17, 476-484.
Mielenz, R.C. et al., (1950). "Effect of calcination on natural pozzolans." Symposium on use of pozzolanic materials in mortars and concretes (pp. 43-92). ASTM.
Ottana, R. et al., (1982). "Hydrothermal synthesis of zeolites from pumice in alkaline and saline environment." Zeolites, 2, 295-298.
Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.
Pisklak, T.J. et al., (2004). "Preparation and characterization of mordenite thin films via pulsed laser deposition." Journal of Porous Materials, 11(4), 191-209.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitization of pumice in ash-sodium salt solutions." Mat. Chem. Phys., 8, 207-216.
Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
Official Action for U.S. Appl. No. 14/478,869 dated Feb. 26, 2015.
Official Action for U.S. Appl. No. 14/098,198 dated Nov. 20, 2014.
Official Action for U.S. Appl. No. 14/067,143 dated Mar. 12, 2015.
Search Report and Written Opinion for International Application PCT/US14/054791 dated Sep. 9, 2014.
Search Report and Written Opinion for International Application PCT/US14/054799 dated Sep. 9, 2014.
Search Report and Written Opinion for International Application PCT/US14/054497 dated Sep. 8, 2014.
Search Report and Written Opinion for International Application PCT/US14/04794 dated Sep. 9, 2014, U.S. Appl. No. 14/054,794.
Search Report and Written Opinion for International Application PCT/US14/054496 dated Sep. 8, 2014.
Search Report and Written Opinion for International Application PCT/US14/054380 dated Sep. 5, 2014.
Search Report and Written Opinion for International Application PCT/US14/067112 dated Mar. 5, 2015.
Search Report and Written Opinion for International Application PCT/US14/068804 dated Mar. 17, 2015.
Final Official Action for U.S. Appl. No. 14/067,143 dated Aug. 12, 2015.
Final Official Action for U.S. Appl. No. 14/098,198 dated Jun. 19, 2015.
Official Action for U.S. Appl. No. 14/090,573 dated Jun. 12, 2015.
Final Official Action for U.S. Appl. No. 14/478,869 dated Jun. 17, 2015.
Official Action for U.S. Appl. No. 13/854,115 dated Jul. 15, 2015.
Search Report and Written Opinion for International Application PCT/US15/017564 dated Jun. 3, 2015.
Search Report and Written Opinion for International Application PCT/US15/019709 dated May 22, 2015.
Official Action for U.S. Appl. No. 14/048,486 dated Aug. 17, 2015.
Perspectives on Colloidal Silica; 2015; AkzoNobel; pp. 1-2; https://www.akzonobel.com/colloidalsilica/silica_facts/perspectives/.

* cited by examiner

SET-DELAYED CEMENT COMPOSITIONS COMPRISING PUMICE AND ASSOCIATED METHODS

CROSS-REFERENCE TO RELATED APPLICATIONS

This application is a continuation-in-part of U.S. patent application Ser. No. 13/417,001, titled "Set-Delayed Cement Compositions Comprising Pumice and Associated Methods," filed on Mar. 9, 2012, the entire disclosure of which is incorporated herein by reference.

BACKGROUND

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for an extended period of time (e.g., at least about 1 day to about 2 weeks or more). When desired for use, the set-delayed cement compositions should be capable of being activated whereby reasonable compressive strengths are developed. For example, a cement set activator may be added to a set-delayed cement composition whereby the composition sets into a hardened mass. Among other things, the set-delayed cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

In addition to cementing, drilling and fluid displacement are two other subterranean operations that utilize treatment fluids. Drilling requires the use of drilling fluid or as it is also known, drilling mud. Drilling fluids may be used to maintain hydrostatic pressure in the wellbore, prevent formation damage, suspend cuttings, and to transport cuttings to the surface. Drilling fluids may be water-based or oil-based. Typical water-based drilling fluids may be composed of solely water or a mixture of water and various types of clay. Oil based drilling fluids typically use a base fluid of a petroleum product.

Fluid displacement utilizes one or more fluids to displace another fluid from the wellbore. Typically this may be done to prevent contamination of one fluid with another or the contamination of one fluid with the formation. A displacement fluid or as it is also known, a spacer fluid, may be water-based fluids. In most instances, spacer fluids may be used to separate drilling fluid from a cement composition during a cementing operation. Because the spacer fluid will be used to separate two other fluids, such as the drilling fluid and the cement composition, the spacer fluid should be compatible with both treatment fluids.

Switching between treatment fluids in a subterranean operation can be costly in both time and resources. Varied fluid types may require separate fluid storage, additional manpower, and additional equipment. In addition to the increased operating expenses, varied fluid use may create additional worksite problems such as higher environmental burdens, fluid incompatibilities, and the inability to reuse fluids and materials once their respective portion of the operation has been completed.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
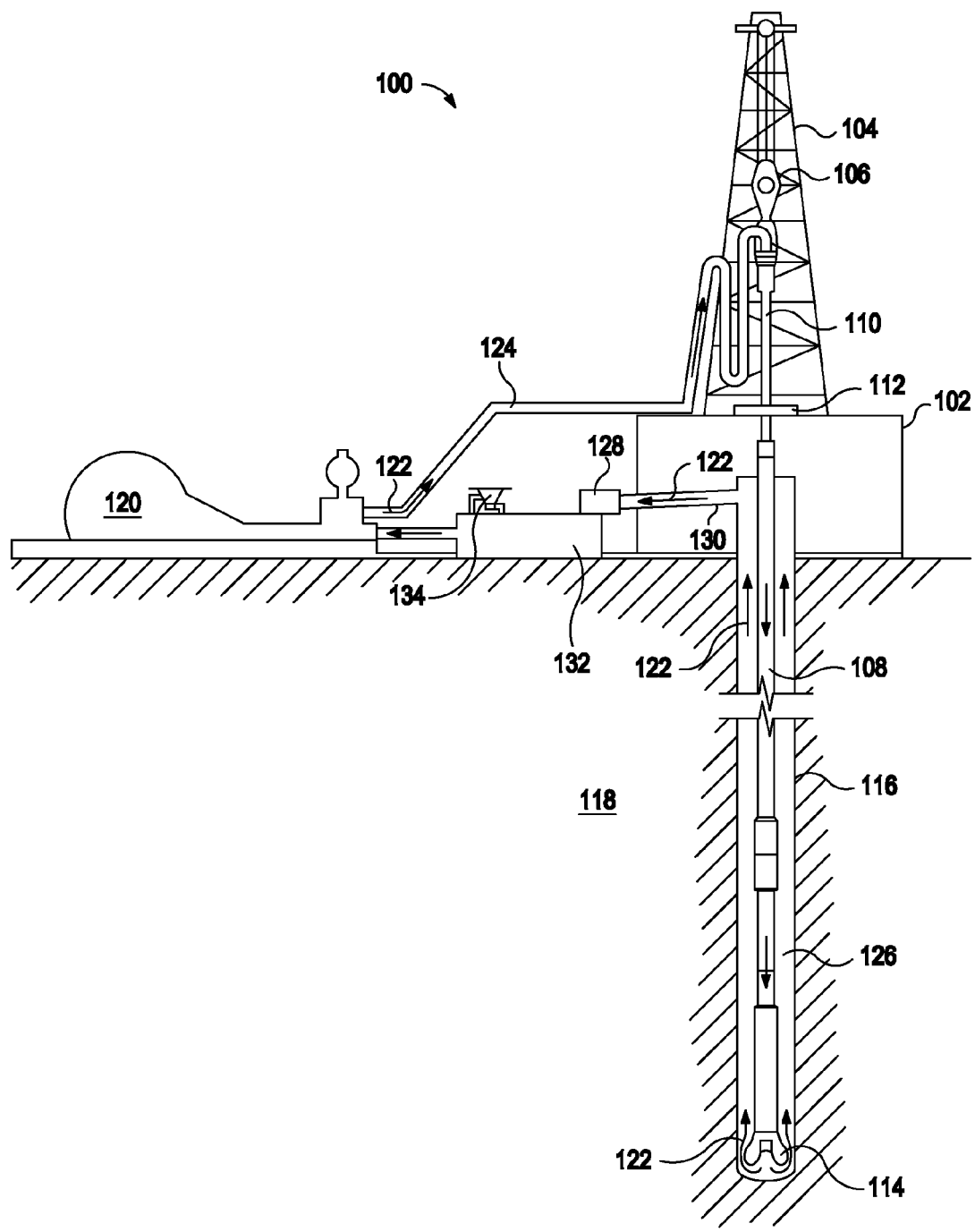
FIG. 1 illustrates a system for drilling a wellbore using a set-delayed cement composition as the drilling fluid in accordance with certain embodiments.

The present embodiments relate to subterranean operations and, more particularly, in certain embodiments, to set-delayed cement compositions and methods of using set-delayed cement compositions in subterranean formations.

Embodiments of the set-delayed cement compositions may generally comprise water, pumice, hydrated lime, and a set retarder. Optionally, the set-delayed cement compositions may further comprise a dispersant. Advantageously, embodiments of the set-delayed cement compositions may be capable of remaining in a pumpable fluid state for an extended period of time. For example, the set-delayed cement compositions may remain in a pumpable fluid state for at least about 1 day or longer. Advantageously, the set-delayed cement compositions may develop reasonable compressive strengths after activation. The set-delayed cement compositions may be suitable for a number of subterranean cementing operations, including those in subterranean formations having bottom hole static temperatures ranging from about 100° F. to about 450° F. or even greater. In some embodiments, the set-delayed cement composition may be used in subterranean formations having relatively low bottom hole static temperatures, e.g., temperatures less than about 200° F.

The water used in embodiments of the set-delayed cement compositions may be from any source, provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in certain embodiments. Further, the water may be present in an amount sufficient to form a pumpable slurry. In certain embodiments, the water may be present in the set-delayed cement composition in an amount in the range of from about 33% to about 200% by weight of the pumice. In certain embodiments, the water may be present in the set-delayed cement compositions in an amount in the range of from about 35% to about 70% by weight of the pumice. One of ordinary skill in the art with the benefit of this disclosure will recognize the appropriate amount of water for a chosen application.

Embodiments of the set-delayed cement compositions may comprise pumice. Generally, pumice is a volcanic rock that may exhibit cementitious properties, in that it may set and harden in the presence of hydrated lime and water. The pumice may also be ground, for example. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 micron, from about 5 microns to about 100 microns, or from about 10 micron to about 50 microns. In one particular embodiment, the pumice may have a mean particle size of less than about 15 microns. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for use for a chosen application.

Embodiments of the set-delayed cement compositions may comprise hydrated lime. As used herein, the term "hydrated lime" will be understood to mean calcium hydroxide. The hydrated lime may be included in embodiments of the set-delayed cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice, for example. In some embodiments, the hydrated lime may be present in an amount ranging between any of and/or including any of about 10%, about 20%, about 40%, about 60%, about 80%, or about 100% by weight of the pumice. In some embodiments, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

Embodiments of the set-delayed cement compositions may comprise a set retarder. A broad variety of set retarders may be suitable for use in embodiments of the set-delayed cement compositions. For example, the set retarder may comprise phosphonic acid, phosphonic acid derivatives, lignosulfonates, salts, organic acids, carboxymethylated hydroxyethylated celluloses, synthetic co- or ter-polymers comprising sulfonate and carboxylic acid groups, borate compounds, derivatives thereof, or mixtures thereof. Examples of suitable set retarders include, among others, phosphonic acid derivatives available from Halliburton Energy Services, Houston, Tex., as Micro Matrix® cement retarder. Generally, the set retarder may be present in the set-delayed cement composition in an amount sufficient to delay the setting for a desired time. In some embodiments, the set retarder may be present in the set-delayed cement compositions in an amount in the range of from about 0.01% to about 10% by weight of the pumice. In specific embodiments, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

As previously mentioned, embodiments of the set-delayed cement compositions may optionally comprise a dispersant. Examples of suitable dispersants include, without limitation, sulfonated-formaldehyde-based dispersants and polycarboxylated ether dispersants. One example of a sulfonated-formaldehyde-based dispersant that may be suitable is a sulfonated acetone formaldehyde condensate, available from Halliburton Energy Services, Houston, Tex., as CFR™-3 dispersant. One example of polycarboxylated ether dispersant that may be suitable is Liquiment® 514L dispersant, available from BASF Corporation, Houston, Tex., that comprises 36% by weight of the polycarboxylated ether in water. While a variety of dispersants may be used in accordance with certain embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

Other additives suitable for use in subterranean cementing operations also may be included in embodiments of the set-delayed cement compositions. Examples of such additives include, but are not limited to, weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement composition after storing but prior to placement of the set-delayed cement composition into a subterranean formation. A person having ordinary skill in the art, with the benefit of this disclosure, will readily be able to determine the type and amount of additive useful for a particular application and desired result.

Those of ordinary skill in the art will appreciate that embodiments of the set-delayed cement compositions generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As previously mentioned, the set-delayed cement compositions may have a delayed set in that they remain in a pumpable fluid state for an extended period of time. For example, the set-delayed cement compositions may remain in a pumpable fluid state at a temperature, for example, about 100° F., for a period of time from about 1 day to about 7 days or more. In some embodiments, the set-delayed cement compositions may remain in a pumpable fluid state at a temperature, for example, about 100° F., for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a high-temperature high-pressure consistometer at room temperature (e.g., about 80° F.) in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with a cement set activator) to thereby set into a hardened mass. By way of example, embodiments of the set-delayed cement compositions may be activated to set to form a hardened mass in a time period in the range of from about 2 hours to about 12 hours. For example, embodiments of the set-delayed cement compositions may set to form a hardened mass in a time period ranging between any of and/or including any of about 2 hours, about 4 hours, about 6 hours, about 8 hours, about 10 hours, or about 12 hours. After activation, the set-delayed cement composition may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement composition may develop a compressive strength in 24 hours of at least about 50 psi, at least about 100 psi, at least about 500 psi, or more. The compressive strengths may be determined in accordance with API RP 10B-2, *Recommended Practice for Testing Well Cements*, First Edition, July 2005, using an UCA at 140° F. while maintained at 3000 psi.

Embodiments may include addition of a cement set activator to the set-delayed cement compositions. Examples of suitable cement set activators include, but are not limited to, calcium chloride, triethanolamine, sodium silicate, zinc formate, calcium acetate, sodium hydroxide, a monovalent salt, nanosilica (i.e., silica having a particle size of less than or equal to about 100 nanometers), a polyphosphate, and combinations thereof. In some embodiments, a combination of the polyphosphate and a monovalent salt may be used for activation. The monovalent salt used may be any salt that dissociates to form a monovalent cation, such as sodium and potassium salts. Specific examples of suitable monovalent salts include potassium sulfate, calcium chloride, and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

The cement set activator should be added to embodiments of the set-delayed cement composition in an amount sufficient to activate the extended settable composition to set into a hardened mass. In certain embodiments, the cement set activator may be added to the set-delayed cement composition in an amount in the range of about 1% to about 20% by weight of the pumice. In specific embodiments, the cement set activator may be present in an amount ranging between any of and/or including any of about 1%, about 5%, about 10%, about 15%, or about 20% by weight of the pumice. One of ordinary skill in the art, with the benefit of this disclosure, will recognize the appropriate amount of the cement set activator to include for a chosen application.

As will be appreciated by those of ordinary skill in the art, embodiments of the set-delayed cement compositions may be used in a variety of subterranean operations, including drilling, fluid displacement, and primary and remedial cementing. Collectively, these types of operations may use the set-delayed cement composition as a "treatment fluid." As used herein, the term "treatment," or "treating" fluid refers to any subterranean operation that uses a fluid in conjunction with a desired function and/or for a desired purpose. The term "treatment," or "treating," does not imply any particular action by the fluid.

In some embodiments, a set-delayed cement composition may be provided that comprises water, pumice, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein.

An embodiment provides a system for drilling and cementing in subterranean formation. The system may comprise a drilling fluid for use in drilling a wellbore in the subterranean formation, the drilling fluid comprising: water; pumice; hydrated lime; and a set retarder. The system further may comprise a set-delayed cement composition for use in cementing in the wellbore, the set-delayed cement composition comprising: water; pumice; hydrated lime; and a set retarder. The system further may comprise a spacer fluid for use in separating the drilling fluid and the set-delayed cement composition in the wellbore, the spacer fluid comprising: water; pumice; hydrated lime; and a set retarder.

In drilling fluid embodiments, a drilling fluid may be used that comprises the set-delayed cement composition. For example, the drilling fluid embodiments comprise the formulations of the disclosed set-delayed cement composition discussed above. In embodiments, the drilling fluid may be comprised entirely of the set-delayed cement composition. In embodiments, the disclosed set-delayed cement composition may be used to drill a subterranean formation, e.g., by circulating the set-delayed cement composition while drilling a wellbore in contact with a drill bit and a subterranean formation. An embodiment may provide a method of drilling a wellbore in a subterranean formation comprising: circulating a drilling fluid comprising a set-delayed cement composition in the wellbore while drilling the wellbore, wherein the set-delayed cement composition comprises: pumice, hydrated lime, a set retarder, and water. In an embodiment, the set-delayed cement composition is used to drill a wellbore in a subterranean formation, after which casing is placed within the wellbore. In further embodiments, all or a portion of the set-delayed cement composition is permitted to set behind the casing.

The exemplary drilling fluids comprising the set-delayed cement composition disclosed herein may directly or indirectly affect one or more components or pieces of equipment associated with the preparation, delivery, recapture, recycling, reuse, and/or disposal of the disclosed set-delayed cement composition. For example, and with reference to FIG. 1, the disclosed set-delayed cement composition may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 comprising the set-delayed cement composition, through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

In embodiments, the drilling fluid 122 comprising the set-delayed cement composition may be added to a mixing hopper 134 communicably coupled to or otherwise in fluid communication with the retention pit 132. The mixing hopper 134 may include, but is not limited to, mixers and related mixing equipment known to those skilled in the art. In alternative embodiments, however, the drilling fluid 122 comprising the set-delayed cement composition may not be added to a mixing hopper. In at least one embodiment, for example, there could be more than one retention pit 132, such as multiple retention pits 132 in series. Moreover, the retention put 132 may be representative of one or more fluid storage facilities and/or units where the disclosed set-delayed cement composition may be stored, reconditioned, and/or regulated until used as drilling fluid 122.

As mentioned above, the disclosed drilling fluids comprising the set-delayed cement composition may directly or indirectly affect the components and equipment of the drilling assembly 100. For example, the disclosed set-delayed cement composition may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary set-delayed cement composition.

The disclosed set-delayed cement composition may directly or indirectly affect the pump 120, which representatively includes any conduits, pipelines, trucks, tubulars, and/or pipes used to fluidically convey the set-delayed cement compositions downhole, any pumps, compressors, or motors (e.g., topside or downhole) used to drive the set-delayed cement composition into motion, any valves or related joints used to regulate the pressure or flow rate of the set-delayed cement composition, and any sensors (i.e., pressure, temperature, flow rate, etc.), gauges, and/or combinations thereof, and the like. The disclosed set-delayed cement composition may also directly or indirectly affect the mixing hopper 134 and the retention pit 132 and their assorted variations.

The disclosed drilling fluids comprising the set-delayed cement composition may also directly or indirectly affect the various downhole equipment and tools that may come into contact with the set-delayed cement composition such as, but not limited to, the drill string 108, any floats, drill collars, mud motors, downhole motors and/or pumps associated with the drill string 108, and any measurement while drilling/logging while drilling (MWD/LWD) tools and related telemetry equipment, sensors or distributed sensors associated with the drill string 108. The disclosed set-delayed cement composition may also directly or indirectly affect any downhole heat exchangers, valves and corresponding actuation devices, tool seals, packers and other wellbore isolation devices or components, and the like associated with the wellbore 116. The disclosed set-delayed cement composition may also directly or indirectly affect the drill bit 114, which may include, but is not limited to, roller cone bits, PDC bits, natural diamond bits, any hole openers, reamers, coring bits, etc.

While not specifically illustrated herein, the disclosed drilling fluids comprising the set-delayed cement compositions may also directly or indirectly affect any transport or delivery equipment used to convey the set-delayed cement composition to the drilling assembly 100 such as, for example, any transport vessels, conduits, pipelines, trucks, tubulars, and/or pipes used to fluidically move the set-delayed cement composition from one location to another, any pumps, compressors, or motors used to drive the set-delayed cement composition into motion, any valves or related joints used to regulate the pressure or flow rate of the set-delayed cement composition, and any sensors (i.e., pressure and temperature), gauges, and/or combinations thereof, and the like.

In displacement fluid embodiments, the set-delayed cement composition may be used as a displacement or spacer fluid. The displacement fluid embodiments comprise the formulations of the disclosed set-delayed cement composition discussed above. In embodiments, the displacement or spacer fluid may be comprised entirely of the set-delayed cement composition. In embodiments, the disclosed set-delayed cement composition may be used to displace a drilling mud or other treatment fluid, e.g., by circulating the set-delayed cement composition back to the surface via the annulus between the drill string and the walls of the borehole. As the spacer fluid is circulated back to the surface, it displaces any prior placed fluids remaining in the wellbore. An embodiment provides a method of displacing a fluid in a wellbore comprising: introducing a spacer fluid comprising a set-delayed cement composition into a wellbore such that the spacer fluid displaces one or more prior fluids from the wellbore, and wherein the set-delayed cement composition comprises: pumice, hydrated lime, a set retarder, and water. In an embodiment, the set-delayed cement composition is used to displace a treatment fluid in a subterranean formation. In this embodiment, the set-delayed cement composition is permitted to set behind the casing.

In additional displacement fluid embodiments, the density of the set-delayed cement composition may be adjusted by the addition of water and/or viscosifier, for example. The water and viscosifiers may be added in any amount to achieve the appropriate density for a rheological hierarchy for a given application. An example of a suitable viscosifier is SA-1015™ suspending agent available from Halliburton Energy Services, Houston, Tex. Additionally, light weight and heavy weight agents may also be added to adjust the density as is appropriate to maintain the rheological hierarchy. One of ordinary skill in the art, with the benefit of this disclosure, will recognize the appropriate density and method of density adjustment necessary for a chosen application.

Displacement fluid embodiments may also be foamed with a foaming additive and/or a gas, for example, to provide a set-delayed cement composition with a reduced density. The gas used for foaming the composition may be any suitable gas for foaming, including, but not limited to: air, nitrogen, and combinations thereof. Generally, the gas should be in an amount sufficient to form the desired foam. Foaming additives may be included in embodiments to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

As will be appreciated by those of ordinary skill in the art, embodiments of the set-delayed cement compositions of the present invention may be used in a variety of cementing operations, including primary and remedial cementing. In some embodiments, a set-delayed cement composition may be provided that comprises water, pumice, hydrated lime, a set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition. The activation of the set-delayed cement composition may comprise, for example, addition of a cement set activator to the set-delayed cement composition.

In primary cementing embodiments, for example, embodiments of the set-delayed cement composition may be introduced into a space between a wall of a wellbore and a conduit (e.g., pipe strings, liners) located in the wellbore, the wellbore penetrating the subterranean formation. The set-delayed cement composition may be allowed to set to form an annular sheath of hardened cement in the space between the wellbore wall and the conduit. Among other things, the set cement composition may form a barrier, preventing the migration of fluids in the wellbore. The set cement composition also may, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening, such as a void or crack, in the formation, in a gravel pack, in the conduit, in the cement sheath, and/or a microannulus between the cement sheath and the conduit.

Figure 2A:
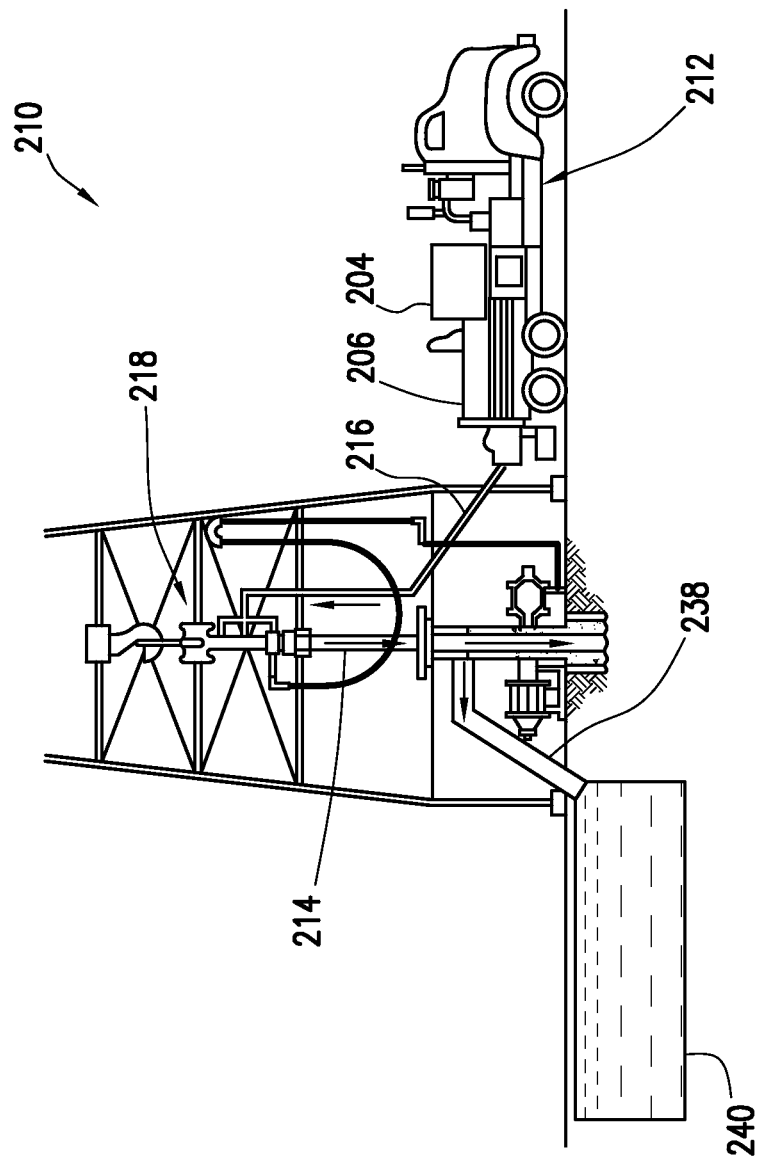
FIG. 2A illustrates surface equipment that may be used in placement of a settable composition in a wellbore in accordance with certain embodiments.

An example technique for placing a set-delayed cement composition into a subterranean formation will now be described with reference to FIGS. 2A and 2B. FIG. 2A illustrates surface equipment 210 that may be used in placement of a set-delayed cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 210 may include a cementing unit 212, which may include one or more cement trucks. The cementing unit 212 may include mixing equipment 204 and pumping equipment 206 as will be apparent to those of ordinary skill in the art. The cementing unit 212 may pump a set-delayed cement composition 214 through a feed pipe 216 and to a cementing head 218 which conveys the set-delayed cement composition 214 downhole.

Figure 2B:
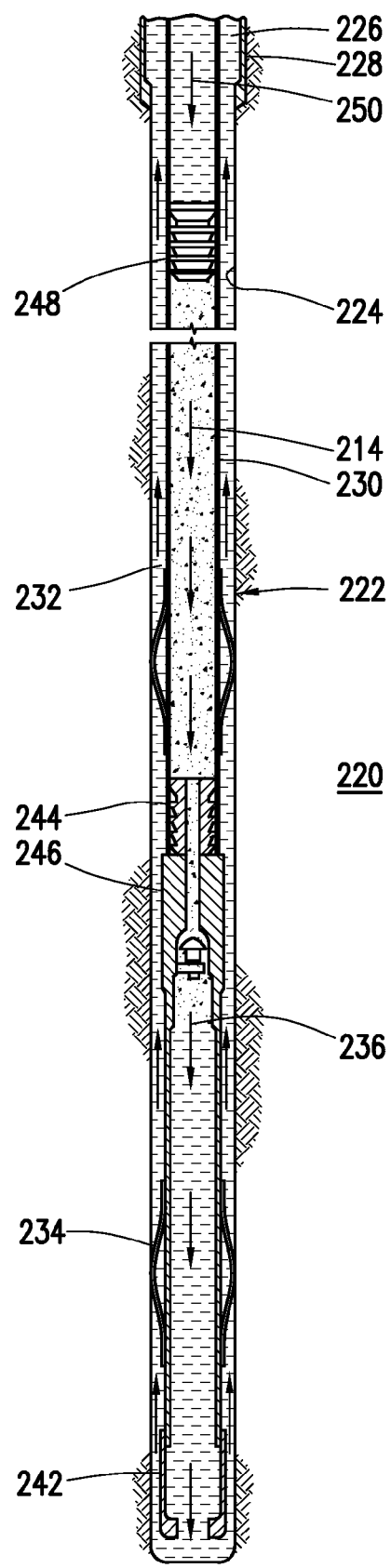
FIG. 2B illustrates placement of a settable composition into a wellbore annulus in accordance with certain embodiments.

Turning now to FIG. 2B, the set-delayed cement composition 214 may be placed into a subterranean formation 220 in accordance with example embodiments. As illustrated, a wellbore 222 may be drilled into the subterranean formation 220. While wellbore 222 is shown extending generally vertically into the subterranean formation 220, the principles described herein are also applicable to wellbores that extend at an angle through the subterranean formation 220, such as horizontal and slanted wellbores. As illustrated, the wellbore 222 comprises walls 224. In the illustrated embodiment, a surface casing 226 has been inserted into the wellbore 222. The surface casing 226 may be cemented to the walls 224 of the wellbore 222 by cement sheath 228. In the illustrated embodiment, one or more additional conduits (e.g., intermediate casing, production casing, liners, etc.), shown here as casing 230 may also be disposed in the wellbore 222. As illustrated, there is a wellbore annulus 232 formed between the casing 230 and the walls 224 of the wellbore 222 and/or the surface casing 226. One or more centralizers 234 may be attached to the casing 230, for example, to centralize the casing 230 in the wellbore 222 prior to and during the cementing operation.

With continued reference to FIG. 2B, the set-delayed cement composition 214 may be pumped down the interior of the casing 230. The set-delayed cement composition 214 may be allowed to flow down the interior of the casing 230 through the casing shoe 242 at the bottom of the casing 230 and up around the casing 230 into the wellbore annulus 232. The set-delayed cement composition 214 may be allowed to set in the wellbore annulus 232, for example, to form a cement sheath that supports and positions the casing 230 in the wellbore 222. While not illustrated, other techniques may also be utilized for introduction of the set-delayed cement composition 214. By way of example, reverse circulation techniques may be used that include introducing the set-delayed cement composition 214 into the subterranean formation 220 by way of the wellbore annulus 232 instead of through the casing 230.

As it is introduced, the set-delayed cement composition 214 may displace other fluids 236, such as drilling fluids and/or spacer fluids that may be present in the interior of the casing 230 and/or the wellbore annulus 232. At least a portion of the displaced fluids 236 may exit the wellbore annulus 232 via a flow line 238 and be deposited, for example, in one or more retention pits 240 (e.g., a mud pit), as shown on FIG. 2A. Referring again to FIG. 2B, a bottom plug 244 may be introduced into the wellbore 222 ahead of the set-delayed cement composition 214, for example, to separate the set-delayed cement composition 214 from the fluids 236 that may be inside the casing 230 prior to cementing. After the bottom plug 244 reaches the landing collar 246, a diaphragm or other suitable device rupture to allow the set-delayed cement composition 214 through the bottom plug 244. In FIG. 2B, the bottom plug 244 is shown on the landing collar 246. In the illustrated embodiment, a top plug 248 may be introduced into the wellbore 222 behind the set-delayed cement composition 214. The top plug 248 may separate the set-delayed cement composition 214 from a displacement fluid 250 and also push the set-delayed cement composition 214 through the bottom plug 244. In some embodiments, the displacement fluid 250 may comprise a set-delayed cement composition. In further embodiments, a displacement fluid 250 comprising a set-delayed cement composition, may comprise a set-delayed cement composition separate from the set-delayed cement composition 214.

In embodiments the set-delayed cement composition may be used for different subterranean operations. In embodiments, the set-delayed cement composition may be used for one or more subterranean operations at a specific worksite. As discussed above, the set-delayed cement composition may serve as a treatment fluid for these different subterranean operations. In embodiments, the set-delayed cement composition may be used as a drilling fluid and also used as a spacer fluid. In other embodiments, the set-delayed cement composition may be used as a spacer fluid and as a cementing composition. In other embodiments, the set-delayed cement composition may be used as a drilling fluid and a cementing composition. In still other embodiments, the set-delayed cement composition may be used as a drilling fluid, a spacer fluid, and a cementing composition. In embodiments, the set-delayed cement composition may be reused or recirculated in the wellbore for the same or a different operation. As an example, at least a portion of the set-delayed cement composition used as a drilling fluid may be removed and then later reintroduced as a displacement fluid and/or a cementing composition in the subterranean formation. As another example, at least a portion of the set-delayed cement composition used a displacement fluid may be removed and then later reintroduced as a cementing composition in the subterranean formation. The reusability of the set-delayed cement composition as any type of treatment fluid allows for the recycling of treatment fluids. Furthermore, this process reduces the amount of equipment and manpower needed between operations in regards to transitioning between operations, fluid handling, and fluid storage. Lastly, because the treatment fluids may be the same for each operation there may no longer be compatibility issues between treatment fluids.

The exemplary set-delayed cement composition disclosed herein may directly or indirectly affect one or more components or pieces of equipment associated with the preparation, delivery, recapture, recycling, reuse, and/or disposal of the disclosed set-delayed cement composition. For example, the disclosed set-delayed cement composition may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement composition. The disclosed set-delayed cement composition may also directly or indirectly affect any transport or delivery equipment used to convey the set-delayed cement composition to a well site or downhole such as, for example, any transport vessels, conduits, pipelines, trucks, tubulars, and/or pipes used to compositionally move the set-delayed cement composition from one location to another, any pumps, compressors, or motors (e.g., topside or downhole) used to drive the set-delayed cement composition into motion, any valves or related joints used to regulate the pressure or flow rate of the set-delayed cement composition, and any sensors (i.e., pressure and temperature), gauges, and/or combinations thereof, and the like. The disclosed set-delayed cement composition may also directly or indirectly affect the various downhole equipment and tools that may come into contact with the set-delayed cement composition such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

EXAMPLE 1

Sample set-delayed cement compositions were prepared that varied in the temperature and presence of activator. All other variables were kept constant. The samples comprised 2000 grams of pumice (DS-325 lightweight aggregate), 400 grams of hydrated lime, 12.0 grams of Liquiment® 514L dispersant, 25 grams of Micro Matrix® cement retarder, and 1300 grams of water. The temperature was held constant at 200° F., 140° F., or 100° F. A set-delayed cement activator was added to one sample in each temperature group. The amount of the activator added was 5% of the combined weight of the pumice and lime. Calcium chloride was used as the activator for the 200° F. and 140° F. samples. Sodium hydroxide was used as the activator for the 100° F. sample. The + sign next to the initial set time data indicates that the test was stopped at that time with the slurry having not reached the conditions for initial setting. The initial set time was determined by placement of a sample into an Ultrasonic Cement Analyzer, available from Fann Instrument Company, Houston, Tex., while maintained at the indicated temperature and 3000 psi. The initial set time was determined in accordance with API RP Practice 10B-2, *Recommended Practice for Testing Well Cements* by recording the time for the sample to reach a compressive strength of 50 psi. The results of this test are set forth in Table 1 below.

TABLE 1

Delayed-Set Behavior as a Function of Temperature

| Temperature (° F.) | $CaCl_2{}^a$ or $NaOH^b$ (% bwo[P + L]) | Initial Set Time (hr:min) |
|---|---|---|
| 200 | 0 | 72:00+ |
| 200 | $5^a$ | 4:23 |
| 140 | 0 | 94:00+ |
| 140 | $5^a$ | 7:49 |
| 100 | 0 | 72:00+ |
| 100 | $5^b$ | 2:51 |

Example 1 thus indicates that the set-delayed cement composition is sufficiently retarded and exists in a stable pumpable state for use as a circulatable treatment fluid. The data also shows that the set-delayed cement composition also remains capable of setting quickly if a suitable activator is used.

EXAMPLE 2

Sample set-delayed cement compositions were prepared. The samples comprised 2000 grams of pumice (DS-325 lightweight aggregate), 4000 grams of hydrated lime, 12 grams of Liquiment® 514L dispersant, 25 grams of Micro Matrix® cement retarder, and 1300 grams of water. The temperature was held constant at room temperature. A Fann Yield Stress Adapter was used with a standard Fann model 35 viscometer. Measurements were taken at RPMs of 600, 300, 200, 100, 60, and 30. The slurries were aged to 8, 14, and 26 days. A viscosity measurement was taken at the time of slurry preparation. This measurement is represented in Table 2 as 0 under the Age of Slurry column. All results are measured in centipoise. The results of this test are set forth in Table 2 below.

TABLE 2

Rheology of the Set-Delayed Cement Compositions over Time

| | Fann Readings | | | | | |
|---|---|---|---|---|---|---|
| Age of Slurry (Days) | 600 RPM | 300 RPM | 200 RPM | 100 RPM | 60 RPM | 30 RPM |
| 0 | 663 cP | 600 cP | 607 cP | 520 cP | 534 cP | 534 cP |
| 8 | 587 cP | 476 cP | 427 cP | 373 cP | 356 cP | 356 cP |
| 14 | 605 cP | 520 cP | 460 cP | 413 cP | 378 cP | 356 cP |
| 26 | 605 cP | 480 cP | 413 cP | 347 cP | 322 cP | 311 cP |

Example 2 thus indicates that the set-delayed cement composition shows lower viscosities than at the time of preparation, however, there is little difference in the viscosities of the slurry over time as shown by comparison of the 8 day and 26 day data sets.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of drilling a wellbore in a subterranean formation comprising:
   circulating a drilling fluid comprising a set-delayed cement composition in the wellbore while drilling the wellbore, wherein the set-delayed cement composition comprises:
   pumice,
   hydrated lime,
   a phosphonic acid derivative set retarder,
   a polycarboxylated ether dispersant, and
   water.

2. The method of claim 1 wherein at least a portion of the drilling fluid is recovered and used to displace one or more prior fluids from the wellbore.

3. The method of claim 1 wherein at least a portion of the drilling fluid is recovered, activated with a cement set activator, introduced into the wellbore, and allowed to set in the wellbore.

4. The method of claim 1 wherein at least a portion of the drilling fluid is allowed to remain in the wellbore, and wherein at least a portion of the drilling fluid is allowed to set behind a casing disposed in the wellbore.

5. The method of claim 1 further comprising storing the set-delayed cement composition for a time period of at least about 7 days prior to the step of circulating the drilling fluid.

6. The method of claim 1 wherein the set-delayed cement composition further comprises a cement set activator, and wherein the cement set activator comprises at least one cement set activator selected from the group consisting of calcium chloride, triethanolamine, sodium silicate, zinc formate, calcium acetate, sodium hydroxide, sodium sulfate, nanosilica, sodium hexametaphosphate, and any combinations thereof.

7. The method of claim 1, wherein the subterranean formation has a bottom hole static temperature ranging from about 100° F. to about 450° F.

8. The method of claim 1, wherein the pumice has a mean particle size in a range of from about 1 micron to about 200 microns.

9. The method of claim 1, wherein the set retarder is present in the set-delayed cement composition in an amount in the range of from about 0.01% to about 10% by weight of the pumice.

10. A method of displacing a fluid in a wellbore in a subterranean formation comprising:
    introducing a spacer fluid comprising a set-delayed cement composition into the wellbore such that the spacer fluid displaces one or more prior fluids from the wellbore, and wherein the set-delayed cement composition comprises:
    pumice,
    hydrated lime,
    a phosphonic acid derivative set retarder,
    a polycarboxylated ether dispersant, and
    water.

11. The method of claim 10 wherein at least a portion of the spacer fluid is recovered from the wellbore, activated with a cement set activator, introduced into the wellbore, and allowed to set in the wellbore.

12. The method of claim 10 wherein at least a portion of the spacer fluid is allowed to remain in the wellbore and allowed to set therein.

13. The method of claim 10 further comprising storing the set-delayed cement composition for a time period of at least about 7 days prior to the step of introducing the spacer fluid.

14. The method of claim 10 wherein the set-delayed cement composition further comprises a cement set activator, and wherein the cement set activator comprises at least one cement set activator selected from the group consisting of calcium chloride, triethanolamine, sodium silicate, zinc formate, calcium acetate, sodium hydroxide, sodium sulfate, nanosilica, sodium hexametaphosphate, and any combinations thereof.

15. The method of claim 10, wherein the subterranean formation has a bottom hole static temperature ranging from about 100° F. to about 450° F.

16. The method of claim 10, wherein the pumice has a mean particle size in a range of from about 1 micron to about 200 microns.

17. The method of claim 10, wherein the set retarder is present in the set-delayed cement composition in an amount in the range of from about 0.01% to about 10% by weight of the pumice.

18. A system for drilling and cementing in subterranean formation, the system comprising:
    a drilling fluid capable of circulation in a wellbore during drilling of the wellbore, the drilling fluid comprising:
    water;
    pumice;
    hydrated lime; and
    a set retarder;
    a set-delayed cement composition capable of setting in the wellbore, the set-delayed cement composition comprising:
    water;
    pumice;
    hydrated lime;
    a polycarboxylated ether dispersant; and
    a phosphonic acid derivative set retarder; and
    a spacer fluid capable of separating the drilling fluid and the set-delayed cement composition in the wellbore, the spacer fluid comprising:
    water;
    pumice;
    hydrated lime; and
    a set retarder.

19. The system of claim 18 further comprising pumping equipment for delivering at least one of the drilling fluid, the set-delayed cement composition, or the spacer fluid to the wellbore; and an activator for activating at least one of the drilling fluid, the set-delayed cement composition, or the spacer fluid.

20. The system of claim 18, wherein at least one of the drilling fluid, the set-delayed cement composition, or the spacer fluid is capable of remaining in a pumpable fluid state at a temperature of about 100° F. for at least 7 days.

* * * * *